P. OLIVIER-LECQ.
Weeder or Scraper.

No. 221,684. Patented Nov. 18, 1879.

ATTEST:
Walter W. Scott
George H. Fraser

INVENTOR:
Paul Olivier-Lecq
by his attorneys
Burke, Fraser & Connett

UNITED STATES PATENT OFFICE.

PAUL OLIVIER-LECQ, OF TEMPLEUVE, FRANCE.

IMPROVEMENT IN WEEDERS OR SCRAPERS.

Specification forming part of Letters Patent No. 221,684, dated November 18, 1879; application filed September 12, 1879.

*To all whom it may concern:*

Be it known that I, PAUL OLIVIER-LECQ, of Templeuve, Nord, France, have invented certain Improvements in Mechanical Weeders or Scrapers, of which the following is a specification.

My invention relates to devices for weeding plants that have been arranged in groups or hills, or scraping out parts of rows where the seed has been planted in a continuous furrow, and it is desired that only hills or groups shall be permitted to mature.

The machine is especially adapted to the cultivation of beet-roots, where it is employed for the purpose of extirpating the plants at intervals, leaving only isolated bunches or groups at uniform distances apart.

Figure 1:
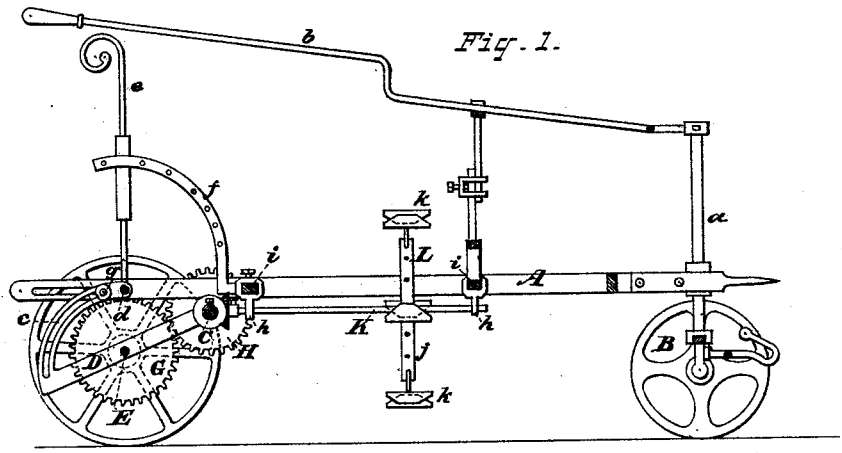
Figure 2:
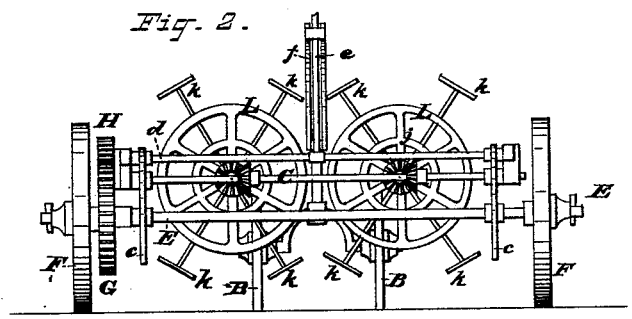
Figure 3:
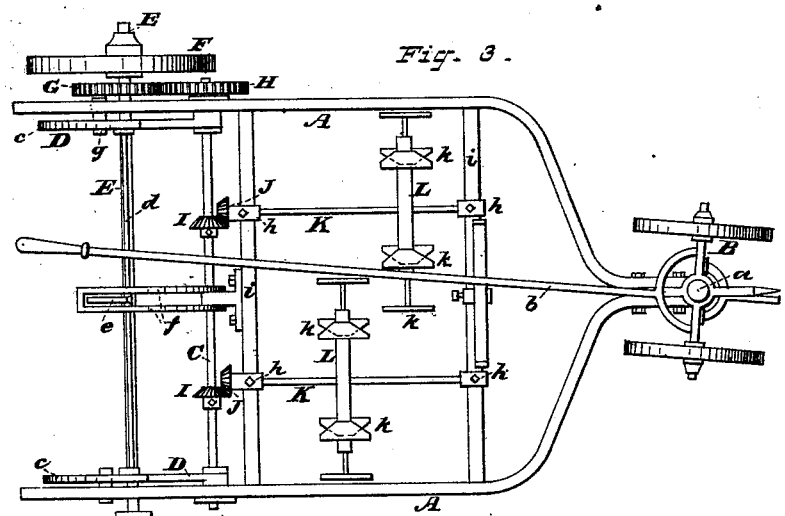

In the drawings, Figure 1 is a vertical sectional view of my improved machine. Fig. 2 is a rear elevation of the same. Fig. 3 is a plan of the machine.

Let A represent a suitable frame for the support of the operating mechanism. This frame is mounted at the forward end upon a two-wheeled carriage, B, which is swiveled on a vertical axis, $a$, and provided with a rod, $b$, which extends to the rear of the machine, and furnishes a means whereby the operator may steer the same. At the rear end the frame A has bearing-lugs, and is mounted on a cross-shaft, C. On this shaft C, just inside the frame, are hung links D D, in which the axle E of the main ground-wheels F of the machine are mounted. These links are provided with curved and slotted extremities $c\,c$, which are connected by a tie-rod, $d$. In this rod is fixed an operating-lever, $e$, which plays between two curved guides, $f$. The rear ends of the frame A, adjacent to the slotted segments $c\,c$, are also slotted, and guide-bolts $g\,g$ pass through both.

By means of the lever $e$ the frame A may be raised or lowered at the rear end, and it may be held at any desired elevation by passing a pin through the guides $f$ in front of the lever $e$, or by some equivalent stop device. The purpose of this adjustment will be hereinafter explained.

To one of the ground-wheels F is attached a toothed wheel, G, which meshes with another, H, on the shaft C. On this shaft are mounted adjustable bevel-gears I I, which mesh with corresponding bevel-gears J J on shafts K K arranged at right angles to the main axle E. The shafts K K are hung in adjustable bearing-boxes $h\,h$ mounted on cross-bars $i\,i$ of the frame A, whereby I am enabled to shift the position of the shafts laterally at will.

On the shafts K are mounted rotary weeders or scrapers, which are designated generally by the letter L. These consist of a disk or wheel, $j$, and radial hoes $k\,k$, the shanks of which find bearings in the said wheels $j$, where they may be retained in any position desired.

The disk or wheel of the weeder is formed of concentric rims, as indicated in Fig. 2, which are perforated or bored radially to receive the shanks or stems of the hoes and retain them in position.

The operation of the machine, so far as described, is as follows: The shafts K K are adjusted properly with regard to the rows of plants—*i. e.*, so as to bring the weeders L over the rows. The rear end of the frame A is now let down, through the medium of the mechanism before described, until the hoes $k$ are low enough to scrape or hoe the ground. The machine is now drawn forward, preferably by horses, care being taken to guide it properly with reference to the rows of plants. As it advances the weeders L are caused to rotate through the gears G, H, I, and J, and the hoes $k$ cut out the plants in the rows at intervals, the distance between the intervals being governed by the distance between the hoes and the rotating speed of the weeders as compared with the speed of the machine, those plants which escape extirpation being such as stand in the interval between the stroke of one hoe and the stroke of the next succeeding hoe, which will be somewhat advanced.

One, two, or more weeders, L, may be arranged in one machine, the number being regulated somewhat by the character of the plants operated upon.

The hoes may be of any shape best suited to the work, and are best made removable from the wheel $j$. They may be arranged in groups in the wheel, or be arranged at equal distances around its periphery, as shown, and their shanks may be flattened, the better to receive the points of set-screws.

The weeders L may be speeded up, or their speed may be reduced, as the exigencies of the case require, by employing larger or smaller bevel-wheels J.

Rotation of the weeders may be effected in whole or in part by means of belts or chains in lieu of the gearing shown, and the driving ground-wheel F may be provided with the ordinary ratchet device or a clutch, whereby in backing the weeders will not be rotated.

In driving to or from the field, or at other times, when desired, the rear of the frame bearing the weeders may be lifted so that they are clear of the ground.

In some cases I contemplate employing hoes or scrapers arranged in front of the weeders L to weed between the rows; but these will not be rotative, nor possess any special novel features in themselves.

I claim—

1. In a weeder and scraper, the combination of the frame A, mounted on the rod C, the links D D, hung on the rod C, the axle E, mounted in bearings in the links D D, the lever e arranged to play in the guides f, the ground-wheels, the gears I J, the shafts K, and the weeders L, all constructed and arranged to operate substantially as set forth.

2. The combination of the frame A, mounted on the shaft C, and slotted at its rear ends, the axle E provided with bearings in the links D D, the said links hung on the shaft C, and provided with curved extremities c c, the tie-rod d, and lever e, all arranged substantially as set forth.

In testimony whereof I have signed my name to this specification before two subscribing witnesses.

P. OLIVIER-LECQ.

Witnesses:
ROBT. M. HOOPER,
JULES ARMENGAUD, Jeune.